_United States Patent Office_

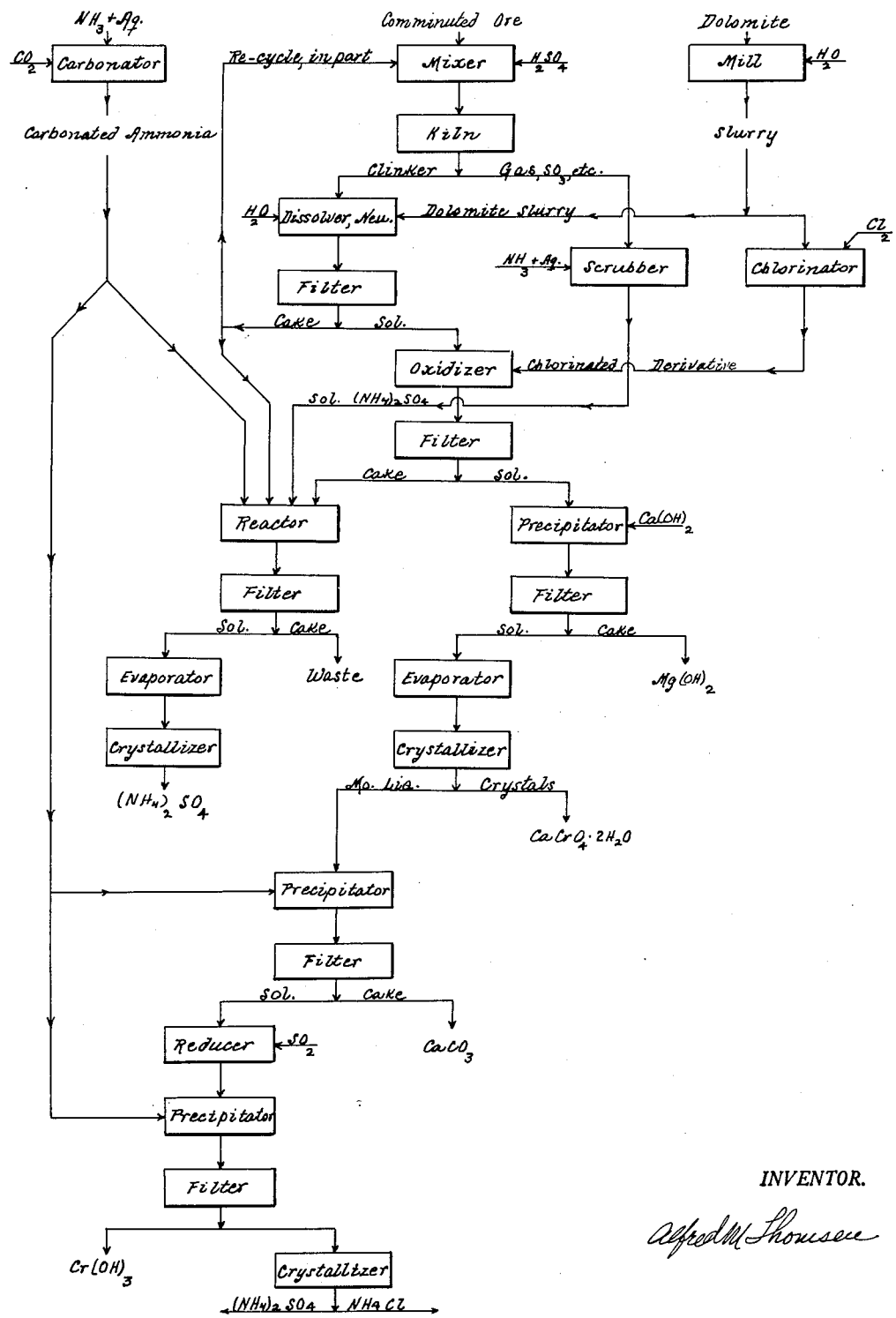

2,754,173
Patented July 10, 1956

2,754,173
METHOD OF MANUFACTURING CHROMIUM COMPOUNDS

Alfred M. Thomsen, San Francisco, Calif., assignor to American Chrome Company, a corporation of Nevada Application December 11, 1952, Serial No. 325,280

2 Claims. (Cl. 23—56)

The principal form in which chromium is found in nature is as the mineral chromite which when pure is a combination of the oxides of chromium and iron. The common occurrence bears but little resemblance as much of the chromium may be replaced by aluminum or magnesium or both and the iron may be so increased in relative proportion as to make the final aggregate a chrome-bearing iron ore rather than chrome ore. Naturally, the more expensive ores are those that contain the maximum of chrome and the minimum of other impurities. In practice the cheaper ores are often preferred because of their lower cost, and they also lend themselves advantageously to the manufacture of by-products.

In my process I prefer such cheaper ores and I aim to make the fullest use of all such additional value as said ores can be made to yield. I, therefore, depart sharply from present day practice which follows two main trends. In the first, the ore is calcined with soda and leached with the formation of a solution of sodium chromate, hence no by-products appear. In the second, the ore is dissolved in sulphuric acid solution in a pressure digestion with chromic acid acting as a catalyst. Separation of the metals then takes place cumbersomely by crystallization as complex double salts with ammonium sulphate, at high cost and without by-product utilization.

In the attached flow sheet I have indicated at length a preferred illustration of my process, but before describing this in detail I wish to summarize briefly the object and the approach. A chrome ore, which may be of very poor grade by accepted standards, is first converted into a sulphate solution of the resident metals with the necessary amount of sulphuric acid. Said solution is then oxidized with chlorine, or a chlorine derivative, converting the resident chromium into a water-soluble chromate. All resident metals, save calcium and magnesium, are then precipitated by calcium and/or magnesium, which may be introduced as the native carbonate or as the calcined oxide, as desired. By oxidizing in a neutralized menstruum these reactions can take place simultaneously. The neutralizing agent may be lime or magnesia, preferably the native dolomite.

The preferred position of dolomite will introduce much magnesia into the circuit which subsequently is removed as a valuable by-product. Similarly, the calcium sulphate formed in these reactions is decomposed with carbonated ammonia and all sulphur compounds entering into the process are thus ultimately obtained as ammonium sulphate, a principal by-product.

The residual liquor after these reactions is a solution of calcium chloride and calcium chromate. By crystallization this solution yields as an end product crystalline calcium chromate and an impure mother liquor advantageously reduced with sulphur dioxide and precipitated to yield calcium carbonate, a precipitated chalk of considerable value, another precipitate of chromium hydroxide, and finally a solution of the sulphate and chloride of ammonium, the precipitant having been more ammonia.

It will thus be seen that I have succeeded in reclaiming all chemicals used in the process. The surphuric acid appears, en toto, as ammonium sulphate; the chlorine as ammonium chloride; the dolomite yields its resident magnesia together with that present in the ore itself; while the calcium of said dolomite appears, at least in part as precipitated chalk. Simultaneously, the chromium is extracted in its hexavalent form, from which all other types and compounds may then be derived. Naturally, this results in a composite chemical operation from which very high grade chromium in any desired form can be obtained at a substantial reduction in cost over present day practice of calcination with soda to obtain sodium chromate.

As previously stated, the preferred version of my process appears on the flow sheet but I do not limit myself to slavishly following the steps actually delineated therein. Thus, limestone may be substituted for dolomite and burned lime for either one without departing from my process. Similarly, chlorine may be used directly upon the chrome solution without the formation of a chlorinated derivative, and so forth. All such minor deviations I regard as within the framework of this disclosure.

The flow sheet will now be described in such detail that it will serve as a model for any one practicing my process. Chromite, the native mineral, is not easily attacked by sulphuric acid, but if the ore be very finely ground, mixed with strong acid, 66° B., and heated to a temperature of a little below the fuming point of the acid then the attack proceeds with reasonable celerity though hot storage for some 8 hours is advantageous in reducing the unused acid to some 15% of the total. I prefer to use a rotary kiln with gentle heat to accomplish the reaction. Only enough acid should be used to form a final product reminiscent of cement clinker.

In the event that the reaction is incomplete through a deficit of sulphuric acid it is manifestly simple to repeat the mixing and heating upon the residue until the chromium content shall have been reduced to an acceptable amount. In the flow sheet I have indicated this step by showing a part of the residue remaining after leaching as re-cycled to the mixing stage. Manifestly, either re-cycling or retreatment will depend too much upon the actual non-chrome constituents to specify which plan would take the preference.

The clinker-like sulphated ore is next dissolved in water with long continuing boiling. Apparently at least four hours of time is required to so hydrate the anhydrous sulphate as to render it water soluble. This is best done on a batch basis in an acid proof tank, heated with live steam, and after such boiling the free acid still remaining is neutralized with either lime or magnesia or both, hence the preferred use of dolomite. The resultant slurry is then filtered giving as a cake a mixture of undissolved ore and calcium sulphate if lime has entered into the neutralizing step. This is then either, re-treated, re-cycled, or rejected as its composition will demand.

I have next indicated the filtrate from the just mentioned step as oxidized with chlorine. The actual method is optional but I prefer the one delineated. The active chlorine is first passed into a slurry of lime or magnesia, as carbonate or hydroxide, or a mixture of both and the chlorinated product is commingled in sufficient amount with the chromium solution to yield the hexavalent form. Instead, of course, an excess of base could be added to the chrome solution and chlorine could be passed into the mixture but said reaction is more difficult to control.

After completion of oxidation, which may be done either hot or cold, the solution is filtered but in any event the slurry must be thoroughly boiled before filtration. This will cause considerable additional hexavalent chromium to pass from the suspended solids to the solution. The filtered-off mud, after thorough washing will be found to contain but minimal amounts of trivalent chromium and virtually none of the hexavalent variety.

The cake from the above filtration is then shown as commingled in a "reactor," which is but a tank with an efficient agitator, with the cake previously obtained after acid treatment and neutralization. I have also shown two solutions entering the same device. One is carbonated ammonia, which will convert the resident calcium sulphate into ammonium sulphate, the second is a solution of ammonium sulphate obtained by scrubbing with ammonia water the waste gases from the "kiln" in which the sulphating operation took place. In this manner I salvage and collect much sulphuric acid which otherwise would have been wasted. Its recovery in marketable form, as illustrated, is entirely conventional.

Returning now to the filtrate from the second filtration, I have shown this as entering into a "precipitator," just another agitator, where it is commingled with enough lime to precipitate the resident magnesium as the hydroxide, leaving in solution a mixture of calcium chloride and calcium chromate. After filtration to remove said magnesium hydroxide, the resultant solution is evaporated and crystallized, yielding a crystal product of very pure calcium chromate and an impure mother liquor consisting chiefly of calcium chloride but still much calcium chromate, as an impurity, will remain.

Of course, this impure mother liquor can be split up into its component parts by further recourse to crystallization and evaporation with appropriate re-cycling of impure intermediate products such as would suggest itself to any operator if the final products were to be but calcium chromate and chloride. I would, however, in most cases prefer to use said mother liquor in the way I have indicated on the flow sheet.

I have shown said mother liquor as commingled with additional carbonated ammonia water in a "precipitator" with subsequent separation of the calcium carbonate thus produced, leaving as a filtrate a solution of ammonium chromate. This is now reduced with sulphur dioxide thus converting the resident chromium into the sulphate which, of course, remains commingled with the sulphate of ammonium and chloride of ammonium formed in the reaction or already present. In the following precipitation step this chromium is precipitated by the additional use of still more ammonia, which may be carbonated or not as the operator selects. I have represented it as carbonated because, in general, it yields a more easily filterable precipitate.

After removal of the chromium hydroxide thus formed the filtrate will consist of a solution of the sulphate and chloride of ammonium. I have represented this as split into its component parts by crystallization, which is entirely conventional and thus requires no further description. It is obvious that this sequence of steps could have been used on the entire solution remaining after the previously described separation of magnesium hydroxide and thus all the chromium would have been obtained as the hydroxide. It is equally obvious that separated calcium chromate could likewise be reduced to the trivalent form.

Similarly, any alkali metal chromate can be produced from such calcium chromate by interaction with the corresponding alkali metal carbonate or sulphate. Likewise, chromic acid itself will result if calcium chromate be treated with the requisite amount of sulphuric acid and the resultant calcium sulphate removed. Manifestly all sulphate of calcium resulting from such reactions can be treated with carbonated ammonia, as previously described under treatment of filter cakes containing calcium sulphate.

It is equally obvious that the chromium hydroxide produced as described herein can serve as a source of any trivalent, or even di-valent, types of chromium compounds that it is desired to manufacture. Inasmuch as all such matters may be regarded for the moment as purely conventional there seems no need for further elucidation save calling attention to the fact that such ramifications do exist and may be applied as desired.

I may, therefore, summarize my process in the following words: Putting all resident metals in an ore in solution as sulphates by interaction with sulphuric acid; oxidizing the resident chrome in said solution with chlorine; precipitating the resident metals, save the hexavalent chromium, by the use of a basic form of magnesium and/or calcium; separating said chromium in combination with the requisite base; and recovering sulphuric acid and chlorine in the form of ammonium sulphate and chloride, respectively. It is in the field of by-products that perhaps the greatest opportunity of lowered costs may be found in the industry of today. The field of chromium is singularly lacking in such opportunities and I believe that my process will aid in filling the existing void.

Having thus fully described my process, I claim:

1. The method of separating chromium from its ores which comprises commingling a comminuted ore containing chromium and other metal values with concentrated sulphuric acid in sufficient amount to convert the metal values to metal sulphates, heating the mixture to a temperature between 150° C. and 250° C. until the reaction is substantially complete, dissolving the resultant mass in water until substantially complete hydration has taken place; adding chlorine to the resultant solution to oxidize chromium values therein to hexavalent form, adding a basic compound selected from the group consisting of the hydroxides and carbonates of magnesium, calcium and ammonium to said oxidized solution to precipitate metal values therein, thus leaving in solution such base as is combined as soluble chromate and as chloride salts, removing said precipitate, and separating the soluble chloride and chromate salts in the resultant solution from said solution.

2. The method of separating chromium from its ores which comprises commingling a comminuted ore containing chromium and other metal values with concentrated sulphuric acid in sufficient amount to convert the metal values to metal sulphates, heating the mixture to a temperature of between 150° C. and 250° C. until the reaction is substantially complete, dissolving the resultant mass in water until substantially complete hydration has taken place, adding chlorine to the resultant solution to oxidize chromium values therein to hexavalent form, adding a basic compound selected from the group consisting of the hydroxides and carbonates of magnesium, calcium and ammonium to said oxidized solution to precipitate metal values therein, removing the precipitated metal values from the solution, adding sulphur dioxide to the solution until the chromium values therein are present in tri-valent form, precipitating the tri-valent chromium in said solution as chromium hydroxide by addition of a basic ammonium compound, separating the precipitated chromium hydroxide, and recovering the ammonium values in said solution.

References Cited in the file of this patent

UNITED STATES PATENTS

| 1,955,326 | Demant | Apr. 17, 1934 |
| 2,381,565 | Udy | Aug. 7, 1945 |
| 2,507,476 | Lloyd | May 9, 1950 |
| 2,601,306 | Lloyd | June 24, 1952 |

FOREIGN PATENTS

| 5,101 | Great Britain | July 21, 1904 |
| 294,965 | Great Britain | Nov. 4, 1929 |

OTHER REFERENCES

"Chemical Engineering," vol. 56, March 1949, pages 242, 244.

Lloyd et al.: "Trans. of Electrochemical Society," vol. 89, 1946, pages 443–448.